US008663545B2

(12) United States Patent
Tomita et al.

(10) Patent No.: US 8,663,545 B2
(45) Date of Patent: Mar. 4, 2014

(54) METHOD OF MANUFACTURING HONEYCOMB STRUCTURE AND HONEYCOMB STRUCTURE

(75) Inventors: Takahiro Tomita, Chita (JP); Shinji Kawasaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1058 days.

(21) Appl. No.: 10/992,109

(22) Filed: Nov. 19, 2004

(65) Prior Publication Data
US 2005/0221053 A1   Oct. 6, 2005

(30) Foreign Application Priority Data
Mar. 31, 2004   (JP) .................................. 2004-102726

(51) Int. Cl.
*B28B 3/20*   (2006.01)
(52) U.S. Cl.
USPC ........................................................ 264/631
(58) Field of Classification Search
USPC ........................................................ 264/631
See application file for complete search history.

(56) References Cited

U.S. PATENT DOCUMENTS

| | | | | | |
|---|---|---|---|---|---|
| 3,725,528 | A | * | 4/1973 | Banin | 423/112 |
| 5,021,373 | A | * | 6/1991 | Mitchell et al. | 501/119 |
| 5,387,564 | A | * | 2/1995 | Takeuchi et al. | 502/62 |
| 5,916,511 | A | | 6/1999 | Kotani et al. | 264/631 |
| 6,004,501 | A | | 12/1999 | Cornelius et al. | 264/631 |
| 6,783,724 | B2 | | 8/2004 | Noguchi et al. | 264/631 |
| 6,863,984 | B2 | * | 3/2005 | Hoke et al. | 428/447 |
| 2001/0046936 | A1 | * | 11/2001 | Lacombe et al. | 502/80 |
| 2003/0041574 | A1 | | 3/2003 | Noguchi et al. | |
| 2003/0151174 | A1 | | 8/2003 | Makino et al. | |
| 2003/0165661 | A1 | | 9/2003 | Noguchi et al. | 428/116 |
| 2006/0003143 | A1 | * | 1/2006 | Uchida et al. | 428/116 |

FOREIGN PATENT DOCUMENTS

| | | |
|---|---|---|
| JP | 06-263430 | 9/1994 |
| JP | 10-259016 a | 9/1998 |
| JP | 3215839 | 8/2001 |
| JP | 2002-219319 | 8/2002 |
| JP | 2002-292616 | 10/2002 |
| JP | 2002-537217 | 11/2002 |
| WO | WO 97/06117 | 2/1997 |

OTHER PUBLICATIONS

Miller, M. and Havber, R.A. 'The Use of Montmodllonites as Extrusion Aids for Alumina' Ceram. Eng. Sci. Proc. 12(1-2), pp. 33-48 (1991).

Li Jinhong et al., "*Research on a New Kind of Environmental Mineral Materials—Cordierite-Matrix Foam Ceramic*," Acta Mineralogica Sinica, vol. 21, No. 3, Sep. 2001, pp. 482-484 (with English Abstract).

Liu Guanshan, "*Production and Application of Sodium Carboxy Methyl Cellulose*," Liaoning Chemical Industry, vol. 31, No. 10, Oct. 2002, pp. 445-447 (with English Abstract).

Shi Keshun, "*Process and Development of Porous Ceramic*," Silicate Bulletin, No. 3, Jun. 1994, pp. 38-44 (with English Abstract).

10th Anniversary Journal of Artificial Clay Research Institute, pp. 175-178, 1999. (Japanese; no English translation).

\* cited by examiner

*Primary Examiner* — Joseph S Del Sole
*Assistant Examiner* — Russell Kemmerle, III
(74) *Attorney, Agent, or Firm* — Burr & Brown, PLLC

(57) ABSTRACT

There are provided a honeycomb structure and a method of manufacturing the structure, capable of preventing or reducing generation of $CO_2$ or harmful gas during firing to thereby prevent or inhibit pollution and global warming, and capable of obtaining a honeycomb structure having few defects such as cracks and maintaining high strength and low thermal expansion. In a method of manufacturing a honeycomb structure, in which a forming material containing a cordierite forming material and an organic binder is kneaded and formed to prepare a honeycomb-shaped formed article (honeycomb formed article), and the prepared honeycomb formed article is fired to obtain a honeycomb-shaped structure (honeycomb structure) mainly composed of cordierite: the forming material containing a layered clay mineral whose layer charge (X) is $0.2<X\le2$ in addition to the cordierite forming material and the organic binder is used; a total amount of at least one element selected from a group consisting of sodium, potassium, and calcium contained in the layered clay mineral is set to 0.5% by mass or less in terms of oxide with respect to a total with the cordierite forming material; and a content ratio of the organic binder is set to 5 parts by mass or less with respect to 100 parts by mass in total of the cordierite forming material and the layered clay mineral.

9 Claims, No Drawings

METHOD OF MANUFACTURING HONEYCOMB STRUCTURE AND HONEYCOMB STRUCTURE

BACKGROUND OF THE INVENTION AND RELATED ART

The present invention relates to a method of manufacturing a honeycomb structure, and a honeycomb structure. In more detail, the present invention relates to a method of manufacturing a honeycomb structure, capable of preventing or reducing generation of $CO_2$ or harmful gas during firing to thereby prevent or inhibit pollution, and global warming, and capable of obtaining a honeycomb structure having few defects such as cracks and maintaining high strength and low thermal expansion, and a high-quality honeycomb structure obtained by this manufacturing method.

Various devices or members such as honeycomb structures formed of ceramic superior in resistances to heat and corrosion have been used as a catalyst carrier for purifying an exhaust gas from viewpoints of environmental countermeasures such as atmosphere pollution prevention and global warming prevention in various fields including chemistry, electric power, iron and steel, and industrial waste disposal. As a method of manufacturing the honeycomb structure, for example, a method of manufacturing a honeycomb structure has been disclosed in which a cordierite forming material, water, organic binder and the like are kneaded, and a forming material whose plasticity has been enhanced is extruded/formed, dried, and fired (see, e.g., Japanese Patent Application Laid-Open No. 2002-292616).

The organic binder imparts plasticity or shape retaining property in order to enhance a forming property of the honeycomb structure. When an added amount increases, the forming property is enhanced. To form a large-sized structure or a structure having a complicated cell structure which has been increasingly demanded in recent years, kneaded clay (clay) having a satisfactory forming property is required as compared with a case where a small-sized or simple honeycomb structure is manufactured. As a result, a large amount of organic binder has to be added.

However, when the added amount of the organic binder is large, the organic binder is burnt out during firing. Therefore, there has been a problem that a space occupied by the organic binder becomes a defect at a forming time, and mechanical strength of the structure drops. In a large-sized structure, there has been a problem that the inside of the structure is at high temperature by burning heat when burning the organic binder during the firing, defects such as cracks are generated because of thermal stress by an inner/outer temperature difference of the structure, the mechanical strength of the structure is lowered, and yield is largely lowered. Furthermore, $CO_2$ or harmful gas is generated, and released to the atmosphere by the burning of the organic binder during the firing, and this has raised a problem in environmental respects such as pollution and global warming.

Moreover, there have been disclosed: a method (see Japanese Patent Publication No. 2002-537217) in which kaolinite clay, and 0.1% to 15% by mass of smectite clay with respect to a dry mass of the kaolinite clay are used; synthetic clay for ceramic (Japanese Patent No. 3215839) comprising 30 to 65% by mass of amorphous silica, 30 to 65% by mass of alumina trihydrate, and 2 to 20% by mass of a mixture of one or two of sepiolite, palygorskite, and bentonite; a plasticity enhancing method (see Japanese Patent Publication No. 6-104563) of kaolinite particles, in which the kaolinite particles are brought into contact with an aqueous solution containing bivalent cations to thereby adsorb the bivalent cations onto kaolinite particle surfaces; a method in which smectite is added as a measure for enhancement of plasticity of clay or kaolin (Artificial Clay (see pages 175 to 178 of 10th Anniversary Journal of Artificial Clay Research Institute); and a method in which montmorillonite and hectorite are added to thereby enhance strength of a formed article in extrusion forming of alumina (see the Use of Montmorillonites as Extrusion Aids for Alumina, Ceram. Engi. Sci. Proc. 12 [1-2] pp. 33 to 48 (1991)).

However, as disclosed in the above-described patent or non-patent documents, main components of a clay mineral having plasticity, such as bentonite and smectite are $SiO_2$, $Al_2O_3$, MgO and the like, and the mineral has sodium ions ($Na^+$) and calcium ions ($Ca^{2+}$) as interlayer cations. With respect to cordierite which is a main component of the finally obtained honeycomb structure, Na and Ca are impurities. Therefore, there has been a problem that low thermal expansion as one of characteristics of cordierite is inhibited, when a large amount of these impurities are contained.

The present invention has been developed in view of the above-described problem, and an object thereof is to provide a method of manufacturing a honeycomb structure, capable of preventing or reducing generation of $CO_2$ or harmful gas during firing to thereby prevent or inhibit pollution and global warming, and capable of obtaining a honeycomb structure having few defects such as cracks and maintaining high strength and low thermal expansion, and a high-quality honeycomb structure obtained by this manufacturing method.

SUMMARY OF THE INVENTION

To achieve the above-described object, according to the present invention, there are provided the following method of manufacturing a honeycomb structure, and a honeycomb structure.

[1] A method of manufacturing a honeycomb structure, in which a forming material containing a cordierite forming material and an organic binder is kneaded and formed to prepare a honeycomb-shaped formed article (honeycomb formed article), and the prepared honeycomb formed article is fired to obtain a honeycomb-shaped structure (honeycomb structure) mainly composed of cordierite, the method comprising the steps of: using the forming material containing a layered clay mineral whose layer charge (X) is $0.2<X\leq2$ in addition to the cordierite forming material and the organic binder; setting a total amount of at least one element selected from a group consisting of sodium, potassium, and calcium contained in the layered clay mineral to 0.5% by mass or less in terms of oxide with respect to a total with the cordierite forming material; and setting a content ratio of the organic binder to 5 parts by mass or less with respect to 100 parts by mass in total of the cordierite forming material and the layered clay mineral.

[2] The method of manufacturing the honeycomb structure according to the above [1], further comprising the steps of: using smectite as the layered clay mineral.

[3] The method of manufacturing the honeycomb structure according to the above [2], further comprising the steps of: using smectite in the form of a dispersion solution in which smectite has been dispersed in water beforehand.

[4] The method of manufacturing the honeycomb structure according to the above [2] or [3], further comprising the steps of: using Na or Ca type smectite whose interlayer cations are sodium ions or calcium ions as smectite.

[5] The method of manufacturing the honeycomb structure according to the above [4], further comprising the steps of:

using ion-exchange smectite having the sodium or calcium ions which are the interlayer cations ion-exchanged into magnesium ions as Na or Ca type smectite.

[6] The method of manufacturing the honeycomb structure according to any one of the above [1] to [5], further comprising the steps of: firing the honeycomb formed article at 1300 to 1500° C.

[7] A honeycomb structure obtained by the method according to any one of the above [1] to [6].

According to the present invention, there is provided a method of manufacturing a honeycomb structure, capable of preventing or reducing generation of $CO_2$ or harmful gas during firing to thereby prevent or inhibit pollution and global warming, and capable of obtaining a honeycomb structure having few defects such as cracks and maintaining high strength and low thermal expansion, and a high-quality honeycomb structure obtained by this manufacturing method.

DESCRIPTION OF THE PREFERRED EMBODIMENT

A best mode for carrying out the present invention will be described concretely hereinafter.

According to the present invention, there is provided a method of manufacturing a honeycomb structure, comprising the steps of: kneading and forming a forming material containing a cordierite forming material and an organic binder to prepare a honeycomb-shaped formed article (honeycomb formed article), and firing the prepared honeycomb formed article to obtain a honeycomb-shaped structure (honeycomb structure) mainly composed of cordierite, wherein the forming material containing a layered clay mineral whose layer charge (X) is $0.2<X\leq2$ in addition to the cordierite forming material and the organic binder is used; a total amount of at least one element selected from a group consisting of sodium, potassium, and calcium contained in the layered clay mineral is 0.5% by mass or less in terms of oxide with respect to a total with the cordierite forming material; and a content ratio of the organic binder is 5 parts by mass or less with respect to 100 parts by mass in total of the cordierite forming material and the layered clay mineral.

In the present invention, the forming material containing the layered clay mineral whose layer charge (X) is $0.2<X\leq2$ is used as the forming material for use in preparing the honeycomb formed article in addition to the cordierite forming material and the organic binder. Examples of another component include water which is a dispersing medium, dispersant, pore former and the like.

The cordierite forming material is kneaded as a main component of the forming material, prepared into kneaded clay (clay), and thereafter formed into the honeycomb formed article. After firing the honeycomb formed article, the cordierite forming material constitutes the honeycomb structure as cordierite which is the main component of a partition wall. Examples of the cordierite forming material include oxide, hydroxide, or carbonate containing at least one element selected from the group consisting of magnesium, aluminum, and silicon, such as talc, kaolin, alumina, aluminum hydroxide, silica, and magnesia.

A content ratio of the cordierite forming material is preferably 94.8 to 99.9% by mass with respect to a total of the cordierite forming material, layered clay mineral, and organic binder. When the ratio is less than 94.8% by mass, a problem sometimes occurs in respect of thermal expansion or strength of the honeycomb structure. When the ratio exceeds 99.9% by mass, it is difficult to form the material into the honeycomb structure.

The organic binder enhances plasticity and forming property of kneaded clay (clay) prepared by kneading the forming material, and further performs a function of a shape retainer which holds the shape of the formed article. On the other hand, the organic binder has problems that pollution or global warming by generation of $CO_2$ or harmful gas is promoted during the firing, a space occupied by the organic binder at the forming time results in defects, or defects such as cracks are generated in the honeycomb structure, and strength of the honeycomb structure drops. Therefore, the content of the organic binder in the forming material needs to be minimized. Therefore, in the present invention, the content ratio of the organic binder is set to 5 parts by mass or less, preferably 4% by mass or less with respect to 100 parts by mass in total of the cordierite forming material and the layered clay mineral. The ratio may be 0 part by mass depending on applications (any organic binder may not be contained).

Examples of the organic binder include organic polymer. Concretely, the examples include hydroxypropoxyl methylcellulose, hydroxypropyl methylcellulose, methylcellulose, hydroxyethyl cellulose, carboxyl methylcellulose, polyvinyl alcohol and the like. The organic binder may be used alone or as a combination of two or more types.

In the present invention, as described above, the content ratio of the organic binder is set to 5 parts by mass or less with respect to 100 parts by mass in total of the cordierite forming material and the layered clay mineral. This is to solve the problem that the pollution or global warming by the generation of $CO_2$ or harmful gas is promoted during the firing, the space occupied by the organic binder at the forming time results in defects, or defects such as cracks are generated in the honeycomb structure, and the strength of the honeycomb structure drops. To compensate for the drop of the plasticity or forming property of the kneaded clay (clay), the forming material is used having both a cordierite forming function and plasticity (forming property) imparting function, and containing the layered clay mineral whose layer charge (X) is $0.2<X\leq2$. It is to be noted that the "layer charge" means, for example, an absolute value of a charge per a composition formula of 2:1 layer of a 2:1 type layered clay mineral represented by smectite.

As to the layered clay mineral, a "mineral group" is defined by a layer structure and layer charge. A layer structure referred to as the 2:1 type only has a layer charge (X) of $0.2<X\leq2$. Concretely, a relation between the layer charge and the layered clay mineral group is shown in Table 1.

TABLE 1

| Layer charge (X) | Mineral Group | Concrete mineral names | Interlayer cation existing as natural product |
|---|---|---|---|
| X = to 0 | Pyrophyllite-talc | Talc | None |
| 0.2 < X < 0.6 | Smectite | Montmorillonite, hectorite | Na, Ca |
| 0.6 < X < 0.9 | Vermiculite | Vermiculite | Mg, (Na, K, Ca) |
| X = to 1 | Mica | White mica, illite | K, Na, Ca (Mg, Fe) |
| X = to 2 | Brittle mica | Margarite | Ca |

As shown in Table 1, examples of the layered clay mineral (group) whose layer charge (X) is $0.2<X\leq2$ in the present invention include smectite, vermiculite, mica, and brittle mica. The examples of concrete mineral names include montmorillonite, hectorite, vermiculite, white mica, illite, margatrite and the like. A layered clay mineral (group) such as smectite, vermiculite, mica, brittle mica or the like contains at least one element selected from the group consisting of sodium, calcium, and potassium.

In the forming material, preferably 0.01 to 25% by mass, further preferably 0.05 to 20% by mass of the layered clay mineral for use in the present invention is contained with respect to the total with the cordierite forming material. It is to be noted that the layered clay mineral for use in the present invention may be used alone, or as a combination of two or more.

In the present invention, the total amount of at least one element selected from the group consisting of sodium, potassium, and calcium contained in the layered clay mineral is set to 0.5% by mass or less in terms of oxide with respect to the total with the cordierite forming material. When the amount exceeds 0.5% by mass, thermal shock resistance of finally obtained cordierite deteriorates. Concretely, a coefficient of thermal expansion increases.

As a method for setting the total amount of at least one element selected from the group consisting of sodium, potassium, and calcium to 0.5% by mass or less in terms of oxide with respect to the total with the cordierite forming material, the type of the layered clay mineral is selectively used. As described later, for example, the "layered clay mineral" is ion-exchanged, or the "layered clay mineral" is dispersed in water to swell.

As a concrete example of the selective use of the type of the "layered clay mineral", smectite, vermiculite, and mica are used alone or as an appropriate combination of two or more.

In the present invention, the use of smectite as the layered clay mineral is preferable from viewpoints of cost and impurity amount. Smectite means a clay mineral group comprising a structure in which a sheet for vertically holding an octahedron layer mainly constituted of aluminum (Al) or magnesium (Mg) and oxygen (O) by a tetragon layer mainly constituted of silicon (Si) or aluminum (Al) and oxygen (O) is regarded as one unit, and ions of alkali metal or alkali earth metal are held between the layers, and includes clay minerals such as montmorillonite, hectorite, and saponite. The clay containing much montmorillonite is generally sometimes referred to as bentonite.

In the present invention, smectite is preferably used in the form of the dispersion solution in which smectite has been dispersed in water beforehand. In this case, even a small amount of smectite is capable of imparting the plasticity and forming property to the kneaded clay (clay). That is, smectite having sodium ions ($Na^+$) between the layers is especially remarkably preferable. When smectite is added to and dispersed in water, it swells (water flows between the layers, and the layers dissociate into individually separate layers). The dispersion solution which has been first loose has gradually increasing viscosity depending on concentration and other conditions, and finally becomes jellified. When smectite is added to the forming material in this state, even a substantially small amount of smectite develops sufficient plasticity and forming property in the kneaded clay (clay). Since the added amount (content ratio in the forming material) of smectite may be substantially small, the low thermal expansion of the finally obtained honeycomb structure is not adversely affected. It is to be noted that a dispersion ratio of smectite in water is not especially limited, but, for example, 10% by mass or less is preferable, and 5% by mass or less is further preferable.

In the present invention, Na or Ca type smectite whose interlayer cations are sodium ions or calcium ions is preferably used as smectite in enhancing the plasticity and forming property of the kneaded clay (clay). It is to be noted that smectite containing both the sodium and calcium ions as the interlayer cations may be used.

In the present invention, ion-exchange smectite obtained by ion-exchanging the sodium or calcium ions which are the interlayer cations into magnesium ions is further preferably used as the Na or Ca type smectite because of the following.

When smectite is used in manufacturing the honeycomb structure comprising partition walls mainly composed of cordierite, sodium or calcium exists as impurities in a final fired article (honeycomb structure). When sodium or calcium is mixed as the impurities into cordierite, a hetero phase is formed, and low thermal expansion which is a feature of cordierite is inhibited. Therefore, the sodium ions ($Na^+$) or calcium ions ($Ca^{2+}$) are exchanged with the magnesium ions ($Mg^{2+}$), and thereafter smectite is modified in such a manner that sodium or calcium is hardly contained, and used in the forming material for preparing the cordierite honeycomb structure. Accordingly, characteristic deterioration can be avoided (the low thermal expansion can be maintained).

In the present invention, a pore former may be further contained in the forming material in order to obtain a porous honeycomb structure. This pore former constitutes a casting mold for pores, the pores having desired shapes, sizes, and distribution are formed in the honeycomb structure, porosity is increased, and high-porosity porous honeycomb structure can be obtained. The examples of the pore former include graphite, flour, starch, phenol resin, polymathacrylic methyl, polyethylene, polyethylene terephthalate, foamed resin (acrylonitric plastic balloon) and the like. These materials form the pores, and burn out themselves. Above all, from a viewpoint of inhibiting the generation of $CO_2$ or harmful gas and the generation of cracks, the foamed resin is preferable. It is to be noted that when the pore former is used, the total of content ratios of the organic binder and pore former is 5 parts by mass or less, preferably 4 parts by mass or less with respect to 100 parts by mass of the forming material.

The ratio at which water is contained as the dispersing medium differs with the forming material for use, and it is difficult to uniquely determine the ratio, but the amount of water is preferably adjusted in such a manner that the kneaded clay (clay) at a forming time has an appropriate hardness.

A method of kneading the above-described forming material to prepare the kneaded clay (clay) is not especially limited, and the examples include a method of using a kneader, a vacuum kneading machine or the like.

In the present invention, the kneaded clay (clay) prepared by kneading the forming material as described above is formed into a honeycomb shape, and dried to thereby prepare a honeycomb formed article.

The shape of the honeycomb formed article is not especially limited, and the examples include a shape in which honeycomb-shaped partition walls extend through between two end faces to thereby form a plurality of cells. When the article is used in filter application such as DPF, end portions of the cells are preferably alternately plugged in two end face portions. The whole shape of the honeycomb formed article is not especially limited, and the examples include a cylindrical shape, a square pole shape, a triangular pole shape and the like. The cell shape (cell shape in a section vertical with respect to a cell forming direction) of the honeycomb formed article is not especially limited, and the examples include a quadrangular shape, a hexagonal shape, a triangular shape and the like.

A method of preparing the honeycomb formed article is not especially limited, and forming methods which have heretofore been known are usable such as extrusion forming, injection forming, and press forming. Above all, a method of extruding the kneaded clay (clay) prepared as described above using a ferrule having a desired cell shape, partition wall thickness, and cell density may be a preferable example. A drying method is not especially limited, and drying methods which have heretofore been known are usable such as hot air drying, microwave drying, dielectric drying, reduced-pressure drying, vacuum drying, and freezing drying. Above all, a drying method obtained by combining the hot air drying and the microwave drying or the dielectric drying is preferable, because the whole formed article can be quickly and uniformly dried.

The honeycomb formed article obtained as described above may be calcined (degreased) to form a calcined article. The calcining means an operation of burning and removing organic materials (binder, dispersant, pore former, etc.) in the formed article. In general, since the burning temperature of the organic binder is about 100 to 300° C., and that of the pore former is about 200 to 800° C., the calcining temperature may be set to about 200 to 1000° C. A calcining time is not especially limited, and is usually about one to ten hours.

Finally, the calcined article obtained as described above is fired (actually fired) to thereby obtain the honeycomb structure. The actual firing means an operation for burning and densifying the forming material in the calcined article to secure a predetermined strength. Since firing conditions (temperature·time) differ with the type of the forming material, appropriate conditions may be selected in accordance with the type. In the present invention, the honeycomb formed article is preferably fired at 1300 to 1500° C. The article is further preferably fired at 1350 to 1450° C. When the temperature is less than 1300° C., a target crystal phase (cordierite) is not obtained in some case. When the temperature exceeds 1500° C., the article is sometimes molten.

According to the present invention, there is provided a honeycomb structure obtained by the above-described method, and the structure has few defects or cracks, has a high quality level while maintaining high strength and low thermal expansion, and is mainly composed of cordierite. The examples of a preferable composition of cordierite include $2MgO \cdot 2Al_2O_3 \cdot 5SiO_2$.

The present invention will be described further concretely hereinafter in accordance with examples, and the present invention is not limited to the examples.

It is to be noted that as indexes indicating that the honeycomb structure obtained in the example has the high strength and the low thermal expansion, isostatic breaking strength and thermal expansion coefficient were measured. A method of measuring the isostatic breaking strength conformed to Automobile Standard JASO-M505-87 of Society of Automotive Engineers of Japan. A measurement method of the thermal expansion coefficient conformed to JIS R1618. Furthermore, as an index indicating that the generation of $CO_2$ or harmful gas is reduced during the firing in the honeycomb structure obtained in the example, a weight decrease during the firing was measured. In a measurement method of the weight decrease during the firing, a weight ($M_1$) of the honeycomb structure before fired, and a weight ($M_2$) of the honeycomb structure after fired were measured, and the weight decrease (%)=$[(M_1-M_2)/M_1] \times 100$ was calculated.

EXAMPLE 1

Synthetic hectorite (Na type) which was a layered clay mineral, and methylcellulose which was an organic binder were added and mixed to kaolin, talc, alumina, aluminum hydroxide, and silica which were cordierite forming materials to form a forming material. It is to be noted that with regard to content ratios of these components, the ratio of synthetic hectorite was set to 2% by mass with respect to a total with the cordierite forming material, and other amounts were adjusted in such a manner as to approach a cordierite composition. The ratio of methylcellulose was set to 4 parts by mass with respect to a total of 100 parts by mass of the cordierite forming material and synthetic hectorite. Furthermore, surfactant (1 part by mass with respect to 100 parts by mass of the forming material) and water (35 parts by mass with respect to 100 parts by mass of the forming material) were added and kneaded to thereby obtain a compact article of kneaded clay (clay). This was formed into a honeycomb shape by an extrusion forming machine, and it was then possible to form the article without causing clogging of a ferrule or defective forming. The obtained honeycomb formed article was dried by microwave and hot air, and fired at 1420° C. for seven hours. When a crystal phase of the obtained honeycomb structure was identified by X-ray diffraction, cordierite was a main phase. A coefficient of thermal expansion of the obtained cordierite honeycomb structure was $1.2 \times 10^{-6}$/K, and was approximately equal to that of Comparative Example 1. An isostatic breaking strength of the honeycomb structure was 4 MPa, and indicated a value slightly larger than that of Comparative Example 1. Moreover, a weight decrease during firing was 10%, and was smaller than that of Comparative Example 1.

EXAMPLE 2

Synthetic hectorite (Na type) which was a layered clay mineral was dispersed in warm water at such a ratio that 5% by mass of slurry was obtained, and left to stand overnight to thereby prepare a synthetic hectorite dispersion solution. Methylcellulose which was an organic binder, and the synthetic hectorite dispersion solution were added and mixed to kaolin, talc, alumina, aluminum hydroxide, and silica which were cordierite forming materials. It is to be noted that with regard to content ratios of these components, the ratio of synthetic hectorite was set to 1% by mass with respect to a total with the cordierite forming material, and other amounts were adjusted in such a manner as to approach a cordierite composition. The ratio of methylcellulose was set to 2 parts by mass with respect to a total of 100 parts by mass of the cordierite forming material and synthetic hectorite. Furthermore, surfactant (1 part by mass with respect to 100 parts by mass of the forming material) and water (33 parts by mass together with a water amount in the synthetic hectorite dispersion solution with respect to 100 parts by mass of the forming material) were added and kneaded to thereby obtain a compact article of kneaded clay (clay). This was formed into a honeycomb shape by an extrusion forming machine, and it was then possible to form the article without causing clogging of a ferrule or defective forming. The obtained formed article was dried by microwave and hot air, and fired at 1420° C. for seven hours. When a crystal phase of the obtained honeycomb structure was identified by X-ray diffraction, cordierite was a main phase. A coefficient of thermal expansion of the obtained cordierite honeycomb structure was $1 \times 10^{-6}$/K, and was approximately equal to that of Comparative Example 1. An isostatic breaking strength of the honeycomb structure was 6 MPa, and indicated a value larger than that of Comparative Example 1. Moreover, a weight decrease during firing was 8%, and was smaller than that of Comparative Example 1.

EXAMPLE 3

Synthetic hectorite (Na type) which was a layered clay mineral was dispersed in a 0.25 mol/l magnesium chloride (MgCl$_2$) solution, stirred for five hours, solid-liquid separated in a centrifugal separating machine, and appropriately cleaned with water to thereby prepare ion-exchanged hectorite. Methylcellulose which was an organic binder, and Mg ion-exchanged hectorite were added and mixed to kaolin, talc, alumina, aluminum hydroxide, and silica which were cordierite forming materials. It is to be noted that with regard to content ratios of these components, the ratio of Mg ion-exchanged hectorite was set to 6% by mass with respect to a total with the cordierite forming material, and other amounts were adjusted in such a manner as to approach a cordierite composition. The ratio of methylcellulose was set to 2 parts by mass with respect to a total of 100 parts by mass of the cordierite forming material and Mg ion-exchanged hectorite. Furthermore, surfactant (1 part by mass with respect to 100 parts by mass of the forming material) and water (38 parts by mass with respect to 100 parts by mass of the forming material) were added and kneaded to thereby obtain a compact article of kneaded clay (clay). This was formed into a honeycomb shape by an extrusion forming machine, and it was then possible to form the article without causing clogging of a ferrule or defective forming. The obtained formed article was dried by microwave and hot air, and fired at 1420° C. for seven hours. When a crystal phase of the obtained honeycomb structure was identified by X-ray diffraction, cordierite was a main phase. A coefficient of thermal expansion of the obtained cordierite honeycomb structure was 0.9×10$^{-6}$/K, and was approximately equal to that of Comparative Example 1. An isostatic breaking strength of the honeycomb structure was 6 MPa, and indicated a value larger than that of Comparative Example 1. Moreover, a weight decrease during firing was 9%, and was smaller than that of Comparative Example 1.

EXAMPLE 4

Synthetic hectorite (Na type) which was a layered clay mineral was added and mixed to kaolin, talc, alumina, aluminum hydroxide, and silica which were cordierite forming materials to form a forming material. It is to be noted that with regard to content ratios of these components, the ratio of synthetic hectorite was set to 2% by mass with respect to a total with the cordierite forming material, and other amounts were adjusted in such a manner as to approach a cordierite composition. Furthermore, surfactant (1 part by mass with respect to 100 parts by mass of the forming material) and water (35 parts by mass with respect to 100 parts by mass of the forming material) were added and kneaded to thereby obtain a compact article of kneaded clay (clay). This was formed into a honeycomb shape by an extrusion forming machine, and it was then possible to form the article without causing clogging of a ferrule or defective forming. The obtained honeycomb formed article was dried by gradually lowering humidity of the atmosphere, and fired at 1420° C. for seven hours. When a crystal phase of the obtained honeycomb structure was identified by X-ray diffraction, cordierite was a main phase. A coefficient of thermal expansion of the obtained cordierite honeycomb structure was 1.2×10$^{-6}$/K, and was approximately equal to that of Comparative Example 1. An isostatic breaking strength of the honeycomb structure was 8 MPa, and indicated a value larger than that of Comparative Example 1. Moreover, a weight decrease during firing was 6%, and was comparatively smaller than that of Comparative Example 1.

COMPARATIVE EXAMPLE 1

Methylcellulose which was an organic binder was added and mixed to kaolin, talc, alumina, aluminum hydroxide, and silica which were cordierite forming materials. It is to be noted that a content ratio of methylcellulose was set to 8 parts by mass with respect to a total of 100 parts by mass of the cordierite forming materials. Furthermore, surfactant (1 part by mass with respect to 100 parts by mass of the forming materials) and water (33 parts by mass with respect to 100 parts by mass of the forming materials) were added and kneaded to thereby obtain a compact article of kneaded clay (clay). This was formed into a honeycomb shape by an extrusion forming machine, and it was then possible to form the article without causing clogging of a ferrule or defective forming. The obtained formed article was dried by microwave and hot air, and fired at 1420° C. for seven hours. When a crystal phase of the obtained honeycomb structure was identified by X-ray diffraction, cordierite was a main phase. A coefficient of thermal expansion of the obtained cordierite honeycomb structure was 0.9×10$^{-6}$/K, and an isostatic breaking strength of the honeycomb structure was 3 MPa. A weight decrease during firing was 13%.

COMPARATIVE EXAMPLE 2

Synthetic hectorite (Na type) which was a layered clay mineral, and methylcellulose were added and mixed to kaolin, talc, alumina, aluminum hydroxide, and silica which were cordierite forming materials. It is to be noted that with regard to content ratios of these components, the ratio of synthetic hectorite was set to 30% by mass with respect to a total with the cordierite forming materials, and other amounts were adjusted in such a manner as to approach a cordierite composition. The ratio of methylcellulose was set to 2 parts by mass with respect to a total of 100 parts by mass of the cordierite forming materials and synthetic hectorite. Furthermore, surfactant (1 part by mass with respect to 100 parts by mass of the forming material) and water (40 parts by mass with respect to 100 parts by mass of the forming material) were added and kneaded to thereby obtain a compact article of kneaded clay (clay). This was formed into a honeycomb shape by an extrusion forming machine, and it was then possible to form the article without causing clogging of a ferrule or defective forming. The obtained formed article was dried by microwave and hot air, and fired at 1420° C. for seven hours. When a crystal phase of the obtained honeycomb structure was identified by X-ray diffraction, cordierite was a main phase, but halo indicating presence of a glass phase was recognized. A coefficient of thermal expansion of the obtained cordierite honeycomb structure was 3.1×10$^{-6}$/K, and indicated a value larger than that of Comparative Example 1. An isostatic breaking strength of the honeycomb structure was 8 MPa, and indicated a value larger than that of Comparative Example 1. Moreover, a weight decrease during firing was 10%, and was smaller than that of Comparative Example 1.

The present invention is preferably used in various separating•purifying devices which are effective as measures for preventing pollution and global warming in various fields such as chemistry, electric power, iron and steel, and industrial waste disposal.

What is claimed is:
1. A method of manufacturing a honeycomb structure, comprising the steps of:
kneading and forming a forming material containing a cordierite forming material and an organic binder to prepare a honeycomb formed article, and firing the prepared honeycomb formed article to obtain a honeycomb structure mainly composed of cordierite;

wherein the cordierite forming material comprises a layered clay mineral having a layer charge X of $0.2<X\leq 2$;

wherein an amount of the layered clay mineral in the cordierite forming material is 0.05 mass % to 20 mass % with respect to a total amount of the cordierite forming material;

wherein a total amount of at least one element selected from the group consisting of sodium, potassium, and calcium in the layered clay mineral of the cordierite forming material is 0.5% by mass or less in terms of an oxide with respect to the total amount of the cordierite forming material; and wherein the organic binder comprises 0% to 5% by mass with respect to 100 parts by mass in total of the cordierite forming material including the layered clay mineral.

2. The method of manufacturing the honeycomb structure according to claim 1, wherein smectite is used as the layered clay mineral.

3. The method of manufacturing the honeycomb structure according to claim 2, wherein the smectite is used in the form of a dispersion solution in which smectite has been dispersed in water.

4. The method of manufacturing the honeycomb structure according to claim 3, wherein Na or Ca type smectite whose interlayer cations are sodium or calcium ions is used as the smectite.

5. The method of manufacturing the honeycomb structure according to claim 4, wherein ion-exchange smectite having the sodium or calcium ions which are the interlayer cations ion-exchanged into magnesium ions is used as the Na or Ca type smectite.

6. The method of manufacturing the honeycomb structure according to claim 2, wherein Na or Ca type smectite whose interlayer cations are sodium or calcium ions is used as the smectite.

7. The method of manufacturing the honeycomb structure according to claim 6, wherein ion-exchange smectite having the sodium or calcium ions which are the interlayer cations ion-exchanged into magnesium ions is used as the Na or Ca type smectite.

8. The method of manufacturing the honeycomb structure according to claim 1, wherein the honeycomb formed article is fired at 1300 to 1500° C.

9. The method of manufacturing a honeycomb structure according to claim 1, wherein the layer charge X is in a range of $0.2<x\leq 0.6$.

* * * * *